United States Patent [19]

Ward

[11] 4,186,086
[45] Jan. 29, 1980

[54] WEAK BASE ION EXCHANGE RESINS OF A POLYALKYLENEPOLYAMINE AND POLYEPOXIDE

[75] Inventor: Eldon L. Ward, Angleton, Tex.

[73] Assignee: The Dow Chemical Company, Midland, Mich.

[21] Appl. No.: 918,873

[22] Filed: Jun. 26, 1978

[51] Int. Cl.$^2$ .......................... C02B 1/56; C08G 59/02
[52] U.S. Cl. .................................... 210/37 R; 54/25; 528/95; 528/121; 528/407; 525/504
[58] Field of Search ................. 210/37 R; 521/25, 34; 528/418

[56] References Cited

U.S. PATENT DOCUMENTS

| | | | |
|---|---|---|---|
| 2,469,684 | 5/1949 | Dudley | 521/25 |
| 2,614,085 | 10/1952 | Fendberg | 521/25 |
| 2,898,310 | 8/1959 | Green | 210/37 R |
| 3,347,802 | 10/1967 | Ashby et al. | 528/418 |
| 4,026,831 | 5/1977 | Moriya et al. | 260/29.2 N |
| 4,032,482 | 6/1977 | Moriya | 260/29.6 EP |

FOREIGN PATENT DOCUMENTS 2447305 4/1975 Fed. Rep. of Germany ........... 528/418

*Primary Examiner*—Joseph L. Schofer
*Assistant Examiner*—Peter Kulkosky

[57] ABSTRACT

The cured reaction product of a polyalkylenepolyamine and a polyepoxide is useful as a weak base ion exchange resin. For example, the reaction of triethylenetetramine and diglycidyl ether of bisphenol A forms a weak base resin having an excellent total weak base capacity.

14 Claims, No Drawings

WEAK BASE ION EXCHANGE RESINS OF A POLYALKYLENEPOLYAMINE AND POLYEPOXIDE

BACKGROUND OF THE DISCLOSURE

This invention relates to weak base ion exchange resins, particularly to weak base resins comprising a reaction product of a polyalkylenepolyamine and polyepoxide and to a method for using them.

Weak base ion exchange resins, herein referred to as weak base resins, are generally solid materials which carry exchangeable anions. They possess the ability to exchange anions with a liquid without substantial structural alteration of the solid resin. For this reason, weak base resins are widely used in waste treatment, e.g., in the removal of undesired components from water and other liquids.

Generally, the most effective weak base resins are substantially insoluble in water but are swellable to a limited degree therein, e.g., 30 to 70 percent, due to their ability to absorb polar solvents. Advantageously, they are also resistant to physical deterioration such as excessive swelling or shattering and have a high porosity and operating capacity. Moreover, in many applications, a spheroidal particle shape in a desired size range is advantageous to provide maximum benefit.

Heretofore, it has been a common practice to use polymers of a polyalkylenepolyamine and an α-halo-β,α-epoxide such as epichlorohydrin as weak base resins. See, for example, U.S. Pat. No. 2,469,683 to Dudley and Lundberg. U.S. Pat. Nos. 2,614,085 and 2,610,156 to Lundberg disclose that such polymers can be prepared as spheroidal particles, i.e., beads. In such preparation, an aqueous syrup of a resinous partially condensed product of the polyalkylenepolyamine and α-halo-β,α-epoxide is dispersed with mechanical agitation in an organic non-solvent dispersion containing a surface active agent. The resulting partially condensed dispersed globules are converted to a water-insoluble resin upon heating.

As a means of altering the physical and chemical properties of the resins, polymers of a polyalkylenepolyamine and polyepoxide, i.e., an organic compound having a plurality of oxiranyl groups are also commonly employed as weak base resins. U.S. Pat. No. 2,469,684 to Dudley discloses the preparation of such resins in granule form. Unfortunately, the resins described therein cannot be prepared as beads by the hereinbefore described methods. More importantly, the resins disclosed therein have relatively low operating capacities and are only slightly swollen by aqueous liquids. Thus, in those processes employing these weak base resins to remove anions from solution, the process must be interrupted frequently to regenerate the resin.

In view of the stated deficiencies of the prior art, it remains highly desirable to provide an improved method for removing anions from solution using the reaction product of a polyalkylenepolyamine and a polyepoxide which does not require frequent regeneration of the resin.

SUMMARY OF THE INVENTION

Accordingly, the present invention is an improved method for removing anions from an anion-containing liquid solution of the type which comprises contacting the anion-containing liquid solution with a weak base ion exchange resin. The improvement in said method comprises using a cured reaction product of a polyalkylenepolyamine and a polyepoxide having a molar ratio (expressed as the moles of polyepoxide to moles of polyalkylenepolyamine) from about 0.1:1 to about 1.5:1 as the weak base resin.

In a preferred embodiment, said cured reaction product is in the form of spheroidal beads.

Surprisingly, the weak base resins employed in the method of the present invention exhibit excellent operating capacity and desirable water swellability properties.

As such, the method of this invention is particularly useful for removing a variety of anions from solution in operations such as deionizing water, separating strong and weak acids, and other purification processes. This method is also useful for removing undesired components from liquids in such fields as medicine, food processing and electroplating.

DETAILED DESCRIPTION OF PREFERRED EMBODIMENTS

Polyepoxides suitably employed in the practice of this invention are organic compounds which contain two or more oxiranyl groups

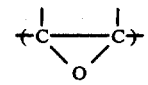

reactive with the amino hydrogens of the polyalkylenepolyamine as hereinafter described. Polyepoxides advantageously employed in this invention are the polyepoxides of aliphatic, alicyclic and aromatic hydrocarbons and combinations thereof. The term "aliphatic, alicyclic and aromatic hydrocarbons" includes inertly substituted aliphatic, alicyclic and aromatic hydrocarbons. By the term "inertly substituted hydrocarbon" is meant a hydrocarbon having one or more substituent groups, such group(s) being inert to the polymerization and cross-linking of the polyepoxide. Polyepoxides of aliphatic, alicyclic and aromatic hydrocarbons are well known in the art, and reference is made thereto for the purposes of this invention. Illustrative examples of such polyepoxides are shown in the *Handbook of Epoxy Resins*, by H. Lee and K. Neville published in 1967 by McGraw-Hill, New York, in Appendix 4-1, pages 4–35 through 4–56. Of particular interest in this invention are diglycidyl phenyl ether, epoxidized butadiene, limonene dioxide, bisepoxydicyclopentyl ether of ethylene glycol, 1,2-epoxy-6-(2,3-epoxypropoxy)hexahydro-4,7-methanoidane; and the polyepoxides having two or more

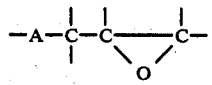

groups wherein each —A— is independently an electron donating substituent such as

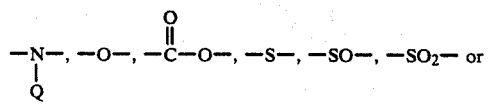

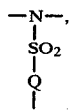

or a covalent bond and Q is an alkyl, alicyclic or aromatic hydrocarbon. Representative examples of the aforementioned polyepoxides include triglycidyl-p-aminophenol; o-glycidyl phenyl glycidyl ether; 2,6-(2,3-epoxypropyl)phenyl glycidyl ether; triglycidyl 4,4-bis(4-hydroxyphenol)pentanoic acid; polyglycidyl ethers such as the diglycidyl ether of butanediol, bisphenol A, bisphenol F, bisphenol S, ethylene glycol, propylene glycol, polyethylene glycol, polypropylene glycol, glycerol, dioxanediol, and water initiated polymerized epihalohydrin; the triglycidyl ether of glycol and the polyglycidyl ether of poly-o-cresol formaldehyde, polyphenol-formaldehyde, polybutadiene, and the like; and polyglycidyl esters such as diglycidyl isophthalate, diglycidyl phthalate, and the like. Preferred polyepoxides are aromatic based polyepoxides, i.e., those having one or more aromatic constituent. Of the aromatic base polyepoxides, preferred are the polyglycidyl ethers, with the diglycidyl ether of bisphenol A and bisphenol F, and the polyglycidyl ether of polyphenol-formaldehyde being the most preferred.

Mixtures of the foregoing polyepoxides are also usable in this invention. Moreover, minor amounts of a monoepoxide compound, i.e., an organic compound having one oxiranyl group and one other reactive group which is reactive with the amino hydrogens of the polyalkylenepolyamine, may be employed in combination with the foregoing polyepoxides. Representative suitable monoepoxides include organic compounds having an $\alpha$-halo-$\beta,\alpha$-epoxy arrangement, such as epihalohydrin, 1,2-epoxy-2-methyl-3-halopropane, 1,2-epoxy-2-methyl-3-halopropane and the like, wherein the other reactive functional group is a halogen radical such as -Cl or -Br; and $\alpha,\beta$-ethylenically unsaturated organic compounds such as 3,4-epoxy-1-butene wherein the other reactive functional group is an alkenyl group. Advantageously, the amounts of said monoepoxide employed are less than about 40 weight percent, preferably less than about 25 weight percent, most preferably less than about 10 weight percent based on the weight of polyepoxide employed. For the purposes of this invention, such mixtures of a monoepoxide and a polyepoxide are included within the term "polyepoxide."

Polyalkylenepolyamines suitably employed in the practice of this invention include polyamines of aliphatic, alicyclic and aromatic hydrocarbons and inertly substituted aliphatic, alicyclic and aromatic hydrocarbons which have sufficient reactive functional groups to form a crosslinked network when reacted with a suitable epoxide in accordance with the methods of the present invention. Typically, functionality is the number of hydrogen atoms attached directly to the nitrogen atoms, i.e., amino hydrogens, of the polyalkylenepolyamine which are capable of reacting with the epoxide such that polymerization and subsequent cross-linking can occur. Generally, when three or more of such amino hydrogens are present, the polyalkylenepolyamine is suitably employed in this invention. Representative examples of polyalkylenepolyamines suitably employed in the practice of this invention include polymethylenediamines such as ethylenediamine, 1,6-hexadiamine and 1,3-propanediamine; polyetherdiamines; diethylenetriamine; iminobispropylamine; bis(hexamethylene)triamine; triethylenetetramine; tetraethylenepentamine; pentaethylenehexamine; aminoethylethanolamine; methyliminobispropylamine; dimethylaminopropylamine; diethylaminopropylamine; methanediamine; bis(2-aminoethyl)sulfide; N-aminoethylpiperazine; 1,3-diaminocyclohexane; isophoronediamine; m-xylylenediamine; tetrachloro-p-xylenediamine; 1,4-bis-(2-aminoethyl)piperazine; piperazine and the like and combinations thereof. Polyalkyleneimines are also suitably employed in the practice of this invention. Representative examples of polyalkyleneimines include polyethyleneimine, polypropyleneimine and the like. Preferred polyalkylenepolyamines include ethylenediamine; diethylenetriamine; triethylenetetramine; 1,3-propanediamine; bis(2-aminoethyl)sulfide; 1,6-hexanediamine; and polyethyleneimine, with triethylenetetramine and diethylenetriamine being especially preferred.

The polyalkylenepolyamine and polyepoxide are advantageously employed at molar ratios (expressed as the moles of polyepoxide to the moles of polyalkylenepolyamine) from about 0.1:1 to about 1.5:1, preferably from about 0.1:1 to about 1.2:1, more preferably from about 0.2:1 to about 1.2:1. Preferably, within the aforementioned ranges of molar ratios, a reactant ratio (expressed as the number of epoxy equivalents to the number of amino hydrogen equivalents) from about 0.1:1 to about 1:1 is advantageously employed, with a reactant ratio from about 0.2:1 to about 0.8:1 being preferred. For the purposes of this invention, epoxy equivalent is the number of reactive oxiranyl groups per molecule of the polyepoxide. When a monoepoxide is employed in combination with a polyepoxide, the term "epoxy equivalents" includes equivalents of the other reactive groups as hereinbefore described. Amino hydrogen equivalents are the number of reactive hydrogen atoms bonded to the nitrogen atoms of the polyalkylenepolyamine.

In a preferred embodiment of this invention, the polyalkylenepolyamine and polyepoxide reaction product is advantageously prepared in bead form by dispersing a blend of the polyepoxide and polyalkylenepolyamine in a reaction medium of a concentrated aqueous solution of an alkali metal hydroxide and maintaining the dispersed blend at conditions sufficient to cure the blend to normally solid, discrete spheroidal beads of the reaction product.

The reaction medium in this embodiment comprises a concentrated aqueous solution of an alkali metal hydroxide and, optionally, a suspending agent. Alkali metal hydroxides suitably employed herein include sodium, potassium and lithium hydroxides or combinations thereof. The alkali metal hydroxide is dissolved in water in an amount sufficient to cause a blend of the reactants, i.e., the polyepoxide and polyalkylenepolyamine, in their desired proportions, to become substantially insoluble in the resulting aqueous solution. This concentration will vary depending on the composition of the polyepoxide, polyalkylenepolyamine and the alkali metal hydroxide employed. In general, minimum concentrations of about 40 weight percent of alkali metal hydroxide based on the total weight of alkali metal hydroxide and water are suitably employed. Preferably, a minimum concentration of at least 50 weight percent based on the total weight of alkali metal hydroxide and water is employed.

Optionally, the aqueous solution of concentrated metal hydroxide also contains a suspending agent therein. Suspending agents suitably employed in the practice of this invention are anionic or non-ionic compounds which reduce agglomeration of the dispersed blend. Advantageously, the suspending agent is soluble or dispersible in the concentrated aqueous solution of the alkali metal hydroxide. Suitable suspending agents include hydroxyalkyl celluloses such as hydroxypropyl methylcellulose, hydroxyethyl cellulose and ethyl hydroxyethyl cellulose; carboxylated methylcellulose; carboxymethylated methyl cellulose; modified starches such as white dextrin and canary dextrin; and xanthum gum. Suspending agents which have been found to be particularly useful include methyl celluloses having a methoxy degree of substitution (M.D.S.) from about 1.5 to about 2.0 and a viscosity at 20° C. in a 2 percent by weight aqueous solution of below about 5600 cps; hydroxypropyl methylcelluloses having a M.D.S. from about 1.0 to about 1.6 and hydroxypropyl D.S. of from about 0.1 to 0.30 and a viscosity at 20° C. in a 2 percent by weight aqueous solution below about 1500 cps, and carboxymethylated methylcellulose having a M.D.S. between about 0.5 to about 2.5, a carboxymethylated degree of substitution (CMC D.S.) between about 0.1 and about 0.7 and a viscosity in a 2 percent aqueous solution of 20° C. less than about several hundred. Other suitably employed suspending agents are readily determined by the experimentational methods presented in Examples 15-24.

The effectiveness of the suspending agent depends upon its composition, its concentration, the proportion and type of each reactant employed, the reaction conditions and the droplet size desired. Advantageously, an amount sufficient to reduce the agglomeration of the dispersed blend in the reaction medium is employed. Typically, in most applications, concentrations from about 0.01 to about 5 weight percent based on the weight of the reactants in the reaction medium are advantageously employed.

In the practice of this embodiment, the reactants, i.e., the polyalkylenepolyamine and polyepoxide are preferably blended at their desired molar ratios prior to being dispersed in the reaction medium. Such blend is preferably neat, i.e., contains nothing other than the reactants. Alternatively, the reactants are added separately to the reaction medium at the desired amounts. The addition of the reactant blend may be continuous, batchwise, or intermittent. The point of addition of the reactants to the reaction medium is not critical, although sub-surface addition is preferred to surface addition.

Preferably, the volume percent of the disperse blend, i.e., the polyalkylenepolyamine and polyepoxide, in the reaction medium is such that the volume ratio of the disperse blend expressed as the ratio of the volume of the reaction medium to the volume of the initial reactants is from about 1:1 to about 15:1. The higher percentages of the disperse blend, e.g., volume ratio from about 1:1 to about 5:1, are preferred when a suspending agent is employed. When no suspending agent is employed, lower percentages of the disperse blend, e.g., volume ratios from about 6:1 to about 15:1, are preferred.

The temperature of the aqueous alkali metal hydroxide solution during the addition of the reactants is advantageously a temperature such that the droplets comprising the reactant blend are polymerized and partially cured within a relatively short time following their addition. Generally, a time of less than about 10 minutes, more preferably, less than about 2 minutes, is desired to achieve partial cure. By the term "partial cure" is meant that the droplets are cured in bead form, i.e., the droplets of the reactant blend are sufficiently solid to remain discrete and retain their spheroidal shape upon their separation from the reaction medium by physical means such as filtration. Initial reaction temperatures suitably employed are dependent upon the amounts of each reactant employed, the relative reactivity of the reactants, and the suspending agent employed. Typically, temperatures between about 50° to about 135° C. are advantageously employed for many reactant blends. The lower temperatures, e.g., about 50° to about 90° C., are generally preferred when a suspending agent is employed. When no suspending agent is employed, the higher temperatures, e.g., about 70° to about 135° C., are preferred to provide a faster cure which prevents excessive agglomeration of the particles prior to their cure into hard resin beads.

The partially cured beads are advantageously maintained in the aqueous solution and at elevated temperatures, e.g., about 50° to about 135° C., for an additional reaction period sufficient to insure cure is complete. The length of this additional reaction period is dependent upon the proportion and type of each reactant employed, the reaction temperature and the size of each individual droplet. Typically, additional reaction periods from about 0.5 to about 3 hours are sufficient to complete the cure. In many cases, the temperature of this additional cure is advantageously the initial reaction temperature. However, when the initial reaction temperature is low, e.g., about 50° C. to about 90° C., the temperature of the aqueous solution is advantageously increased, e.g., to a temperature from about 70° C. to about 135° C. following the partial cure of all the droplets in the aqueous solution. Employment of a low initial reaction temperature with a subsequent increase in temperature is particularly advantageous when using a suspending agent in the reaction medium.

The reaction medium is advantageously agitated during all stages of the reaction, e.g., addition of the reactants, partial cure and completion of the cure. The rate and type of agitation are not critical to the practice of this invention provided the agitation is sufficient to (1) form droplets of the reactant blend upon the reactants introduction to the aqueous solution and (2) disperse the resulting droplets in the reaction medium.

The droplet size and the size of the subsequently formed beads are advantageously controlled and are desirably uniform for any reaction product. Droplet size is primarily determined by the rate and type of agitation and by the concentration and type of the suspending agent employed. In a normal operation, e.g., one using about 0.3 to about 1 weight percent of the suspending agent based on the total weight of reactants and agitation similar to that of Example 15, beads range in size primarily from about 0.07 to about 4 mm. Typically, smaller droplets, e.g., as small as 5 micron, are formed at higher rates of agitation and at greater concentrations of the suspending agent, while larger size droplets, e.g., above 4 mm, are formed at lower agitation rates and smaller concentrations of the suspending agent. Droplet sizes and the sizes of the subsequently cured beads are easily determined by experimentation.

Following the preparation of the cured beads, the beads are easily separated from the aqueous solution by conventional filtration techniques. Following filtration, the recovered beads are advantageously washed to remove any excess alkali metal hydroxide which may be present. The beads are then advantageously dried, yielding a hard resin bead.

The preparation of the reaction product of a polyalkylenepolyamine and polyepoxide in the above-described manner is easily adapted to batch, semi-batch and continuous operations as exemplified hereinafter.

Alternatively, the cured reaction product may be prepared in granular form by blending the polyepoxide and polyalkylenepolyamine at their desired proportion and allowing the blend to react to a cured state as evidenced by a hardening of the blend to a normally solid form. The reaction is advantageously carried out while the blend is exposed to ambient temperatures, i.e., from about 20° to about 25° C., without external heating or cooling applied. Generally, at these conditions, the blend is rendered hard, i.e., cured, in from about 0.1 to about 3 hours.

The cured reaction product is then advantageously broken into small particles or a powder. Preferably, such powder or particles have an average particle size such that at least about 80 weight percent, preferably at least about 90 weight percent of the powder or particles have a particle size less than about 2 mm. Advantageously, the largest particles have a particle size less than about 4 mm, preferably less than about 2.5 mm.

In the practice of this invention, the cured reaction product of the polyalkylenepolyamine and polyepoxide is contacted with an anion-containing liquid solution using conventional ion exchange techniques. Such techniques are well known in the art and reference is made thereto for the purposes of this invention. The anion-containing liquid solution may be an aqueous or non-aqueous solution and such is not critical to this invention. In general, any anion-containing liquid solution suitably employed in conjunction with conventional weak base resins are suitably employed herein. Typically, such solution is aqueous with a pH of less than about 7, preferably less than about 6, or a non-aqueous solution of an organic solvent such as methylenechloride, toluene, methanol or the like. The anion in said solution can be any anion capable of being absorbed by or ion exchanged with the cured reaction product. Typically, such anions are those anions or other material which can be absorbed by or ion exchanged with conventional weak base resins in the free amine form. Representative of such anions are mineral acids such as sulfuric, hydrochloric, chromic, nitric and phosphoric acids, other strongly ionizable acids with a pKa of less than about 5 such as citric acid, wherein pKa is defined as the negative logarithm (base 10) of the acidity constant of the acidic group in water at 25° C., and ash wherein ash is the mineral content of a material after complete combustion.

The following examples are set forth to illustrate the invention in various modes of operation and should not be construed to limit its scope. In the examples, all parts and percentages are by weight unless otherwise indicated.

EXAMPLE 1

To a round bottom 5 l. flask equipped with a stirrer, thermometer, heating and cooling means and addition funnel is added 2500 ml. of a 50 percent aqueous solution of sodium hydroxide. The flask is heated with agitation to 100° C. To the heated flask is added a blend of 73 g. of triethylenetetramine and 176.5 g. of a diglycidyl ether of bisphenol A having an epoxy equivalent of 172–176. The blend quickly disperses into small droplets upon its addition to the aqueous sodium hydroxide. Stirring of the mixture is continued for one hour. The mixture is then cooled to room temperature and the beads collected by filtration.

The collected beads are washed free of sodium hydroxide, swelled in an aqueous solution of 5 percent hydrochloric acid, returned to the base form with an aqueous solution of 4 percent sodium hydroxide and then are washed with water until neutral. At this point, the water-swelled beads weigh 388 grams. Ten grams of the beads are dried, yielding 6.1 grams of dried beads, i.e., the swollen beads contain 39 percent water. This is equivalent to a 95 percent yield based on the total weight of the reactants, i.e., triethylenetetramine and diglycidyl ether of bisphenol A. Examination of the dried beads shows the beads to be clear, unbroken spheres having the following size distribution:

| Diameter, mm. | Volume % of Beads |
| --- | --- |
| Larger than 1.68 | 2.6 |
| 0.84–1.67 | 16.4 |
| 0.30–0.83 | 70.4 |
| 0.21–0.29 | 6.3 |
| 0.10–0.20 | 4.3 |

The beads have an excellent total weak base capacity for hydrochloric acid of 2.2 milliequivalents per milliliter (meq./ml.) which is equivalent to 48.1 kilograins of calcium carbonate ($CaCO_3$) per cubic foot.

The standard operating capacity is determined using a 1 in. inside diameter column filled with the beads to a depth of 24 in. A 4 weight percent aqueous solution of sodium hydroxide is passed through the resin to convert the beads to a free base form. A feed solution of 1,000 ppm H⊕ (½ hydrochloric acid/½ sulfuric acid) is fed through the column until the conductivity of the water effluent has dropped to 50 micromhos (20,000 ohms resistance) which indicates high purity water. The feed is continued at a calibrated flow rate until the conductivity of the effluent water rises above 50 micromhos. In this manner, the weak base operating capacity of the resin beads is found to be 27 kilograins of $CaCO_3$ per cubic foot of resin.

Thus, the beads are highly effective as weak base resins. As such, the beads are effectively employed in the method of this invention.

EXAMPLE 2

The continuous preparation of cured beads is achieved using a vertically mounted glass pipe column (7 ft. length×2 in. inside diameter) which is fitted with a paddle stirrer which is disposed longitudinally in the column. The stirrer comprises a shaft having multiple blades rigidly mounted thereon at a uniform distance from each other. The paddle stirrer shaft is connected at the bottom of the column through a mechanical seal to a variable speed motor. The column is filled with an aqueous solution of 50 weight percent sodium hydroxide. The aqueous solution is heated to 110° C. to 120° C. by a heating tape wrapped around the entire length of the column.

A constant feed stream of 14.2 g. per minute of diglycidyl ether of bisphenol A and a second constant feed stream of 5.9 g. per minute of triethylenetetramine are pumped through a static mixer (1 ft. length×0.25 in. inside diameter) having 21 elements. The mixer blends the reactants into a homogeneous mixture. This mixture is fed into the bottom of the column through a small diameter stainless steel tube into the aqueous sodium hydroxide solution. The stirrer breaks up the stream into small uniform droplets which slowly rise to the top of the column where they are removed by an overflow device. The beads collected are hard, spheroidal, show no evidence of cracking and have a size distribution and operating capacity similar to the beads prepared in Example 1. As such, the beads are suitably employed in the method of this invention.

EXAMPLE 3

In a manner similar to Example 1, 26.2 g. of the diglycidyl ether of bisphenol A and 25.8 g. of polyethyleneimine having a number average molecular weight of 600 as measured by gel permeation chromatography are blended and then reacted. The beads formed are hard, spheroidal and contain 50 percent water in free base form. The beads have an excellent total weak base capacity for hydrochloric acid of 3.0 meq./ml. and are therefore effectively employed in the method of this invention.

EXAMPLES 4–14

In a manner similar to Example 1, the various epoxides and polyalkylenepolyamines are reacted in the proportions and at reaction temperatures as specified in the following table to form weak base resins of spheroidal shape having excellent total weak base capacities.

is added 158 g. of an aqueous solution having dissolved therein 8.2 g. of a carboxymethylated methylcellulose having a M.D.S. of 0.92, CMS D.S. of 0.26, 35 percent active solids and a viscosity of 50 cps (2 percent aqueous solution at 20° C.). The resulting solution is heated to 75° C.

A 500 ml. addition funnel equipped with a polyethylene tube for sub-surface feeding is attached to the flask. A reactant blend consisting of 739 g. of diglycidyl ether of bisphenol A and 311 g. of triethylenetetramine is prepared. The blend was continuously added through the addition funnel over a period of one hour. Agitation during this period is maintained at 270 rpm and temperature at 75° C. After the entire reactant blend is added, the temperature of the flask is increased to 100° C. and maintained for one hour assuring the beads are cured.

The flask is then cooled and the beads collected by filtration. The beads thus collected are washed free of sodium hydroxide and then treated with an aqueous solution of 5 percent hydrochloric acid to place them in a swollen state. The swollen beads have the following uniform bead size distribution.

| Diameter, mm. | Volume % of Beads |
| --- | --- |
| 0.84–1.19 | 1.8 |
| 0.59–0.83 | 29.7 |
| 0.50–0.58 | 20.0 |
| 0.42–0.49 | 15.5 |
| 0.30–0.41 | 23.2 |
| 0.15–0.29 | 8.6 |
| 0.07–0.14 | 1.2 |

When viewed under a microscope, the beads are found to be unbroken, generally spherical and show no signs of coalescence or agglomeration. A portion of the beads

TABLE I

| Example No. | Epoxide (1) | Amine (2) | °C. Temp. | Mole Ratio Epoxide/Amine | % H$_2$O (3) | Total Weak Base Capacity meq./ml. |
| --- | --- | --- | --- | --- | --- | --- |
| 4 | PGE P/F | TETA | 110 | 1/1 | 39 | 2.3 |
| 5 | PGE P/F MEK | TETA | 70 | 0.42/1 | 37.8 | 3.0 |
| 6 | PGE P/F | TETA | 110 | 0.38/1 | 42 | 3.0 |
| 7 | PGE P/F | TETA | 110 | 0.32/1 | 46.5 | 3.1 |
| 8 | PGE P/F | DETA | 110 | 0.35/1 | 27 | 3.4 |
| 9 | PGEBPA | DETA | 110 | 1/1 | 14.7 | 2.5 |
| 10 | DGEBPA | Bis(2-amino ethyl sulfide) | 110 | 1/1 | 21.7 | 1.4 |
| 11 | 50% DGEBPA 50% DGEPG | TETA | 110 | 1/1 | 55 | 1.7 |
| 12 | DGEBPA | TETA | 110 | 0.83/1 | 35 | 3.1 |
| 13 | DGEBPA | TETA | 110 | 1.2/1 | 26 | 2.4 |
| 14* | DGEBPA | TETA | 110 | 1/1 | 45 | 2.0 |

*Example 14 was run using an aqueous solution of 65 percent potassium hydroxide in place of the sodium hydroxide solution.
(1) DGEBPA = diglycidyl ether of bisphenol A with an epoxy equivalent weight of 172–176;
  DGEPG = diglycidyl ether of propylene glycol with an average of 4 propylene glycol oxide moieties and an epoxy equivalent weight of 175–206;
  PGE P/F = polyglycidyl ether of a phenol A-formaldehyde novolac with an epoxy equivalent weight of 172–181;
  PGE P/F MEK = polyglycidyl ether of a phenol A-formaldehyde novolac with an epoxy equivalent weight of 172–181 dissolved in 15 weight percent methylethyl ketone based on the total weight of the solution to reduce viscosity;
  PGE P/F and PGE P/F MEK were heated to 60° F. prior to their addition to the aqueous solution of 50 percent sodium hydroxide.
(2) TETA = triethylenetetramine;
  DETA = diethylenetriamine.
(3) Weight percent of H$_2$O based on total bead weight.

EXAMPLE 15

To a 5 l. flask equipped with a thermometer, constant torque agitator, RPM readout, heating and cooling means is added 3000 ml. of water. Both the heating and cooling means are connected to a temperature control device. To the water in the flask is added 3150 g. of sodium hydroxide pellets which are dissolved upon agitation of 270 rpm. To the sodium hydroxide solution are neutralized with an aqueous solution of 4 percent sodium hydroxide to the free base form yielding a bead containing 32.4 percent water. The beads have an excellent total weak base capacity of 2.5 meq./ml. and are effectively employed in the method of this invention.

EXAMPLE 16

To a 200 ml. beaker equipped with a thermometer, magnetic stirrer bar and drive means, and a temperature control device is added 150 g. of an aqueous solution of 50 percent sodium hydroxide. To the sodium hydroxide solution is added 10 ml of an aqueous solution containing 5 percent (0.2 g.) of a suspending agent. The suspending agent of this example is a carboxymethylated methylcellulose having a M.D.S. of 0.93, a CMC D.S. of 0.12, 40 percent active solids and a viscosity as a 2 percent aqueous solution at 20° C. of 40 cps. This mixture is heated to 50°–60° C.

A reactant blend of 18 g. of diglycidyl ether of bisphenol A and 7.5 g. of triethylenetetramine is added to the beaker with agitation. The beaker is then heated to 70°–75° C. for one hour. Beads are formed from the reactant blend which are unbroken, generally spherical and show no signs of agglomeration or coalescence.

EXAMPLES 17–23

In a manner similar to the procedure outlined in Example 16, various suspending agents are employed in the concentrations as specified in Table II.

TABLE II

| Example No. | Suspending Agent (1) | Concentration (2) gms | Dispersion Appearance (3) | Bead Appearance (4) |
|---|---|---|---|---|
| 17 | CMMC-17 | 0.2 | Excellent | Excellent |
| 18 | CMMC-57 | 0.1 | Excellent | Excellent |
| 19 | HPMC-3 | 0.1 | Good | Excellent |
| 20 | HPMC-150C | 0.1 | Good | Excellent |
| 21 | CP-8003 | 0.2 | Excellent | Excellent |
| 22 | CP-8071 | 0.2 | Excellent | Excellent |
| 23 | CP-7071 | 0.2 | Excellent | Excellent |

(1) CMMC-17 = carboxymethylated methylcellulose with a M.D.S. of 0.86, a CMC D.S. of 0.17, with 37.5 percent active solids and a viscosity in a 2 percent aqueous solution (2 percent viscosity) of 17 cps;
CMMC-57 = carboxymthylated methylcellulose with a M.D.S. of 2.0, a CMC D.S. of 0.125, 100 percent active solids and a 2 percent viscosity of 57 cps;
HPMC-3 = hydroxypropyl methylcellulose with a M.D.S. of 1.12–1.56, a hydroxpropyl D.S. of 0.10–0.29 and a 2 percent viscosity of 3 cps;
HPMC-150C = hydroxypropyl methylcellulose with a M.D.S. of 1.12–1.56, a hydroxypropyl D.S. of 0.10–0.29 and a 2 percent viscosity of 15,000 cps;
CP-8003 = a canary dextrin, i.e., a corn starch made 100 percent water soluble by hydrochloric acid hydrolysis having a viscosity of 3000 cps as a 50 weight percent solution in water sold by Corn Products;
CP-8071 = same as CP-8003 except having a viscosity of 3000 cps as a 57 weight percent solution in water;
CP-7071 = a white dextrin of 96 percent water solubility having a viscosity of 3000 cps as a 55 weight percent solution in water sold by Corn Products.
(2) Concentration is expressed in grams of active suspending agent per 25.5 gm. of the total weight of reactants added to the reaction medium.
(3) The dispersion appearance is a rating of the mixture of the suspending agent and the aqueous solution of 50 percent sodium hydroxide. A rating of excellent indicates an excellent dispersion, generally homogeneous with no precipitation or gelation of the suspending agent. A rating of good indicates some precipitation generally as fine fiber-like material but otherwise a good dispersion.
(4) Bead appearance is a rating of the hardness, shape, integrity and the degree of agglomerationand coalescence of the beads. A rating of excellent indicates the beads are generally hard, spherical, unbroken and show little or no agglomeration or coalescence.

As evidenced by the foregoing table, cured beads showing little or no agglomeration are easily prepared using various suspending agents.

EXAMPLE 24

To a Waring blendor is placed 750 g. of an aqueous solution of 50 percent sodium hydroxide. While agitating the solution at high speed 20 ml. of an aqueous solution containing 5 percent of the suspending agent used in Example 21 is added. After agitating for several minutes, a blend of 142 g. of diglycidyl ether of bisphenol A and 58 g. of triethylenetetramine is added to the blendor. The temperature of the mixture rises. At about 120° C. the agitation is stopped and the product allowed to cool. On standing the beads rise to the top of the blendor, leaving a clear sodium hydroxide lower layer. The beads are collected by filtration.

Analysis of the beads show them to be generally spherical, unbroken and having a size in the range of from about 10 to about 100 microns.

What is claimed is:

1. In a method for removing anions from an anion-containing liquid solution wherein the method comprises contacting the anion-containing liquid solution with a weak base ion exchange resin, the improvement comprising using as the weak base resin a normally solid reaction product of a polyepoxide and a polyamine of an aliphatic, alicyclic or aromatic hydrocarbon having three or more amino hydrogens in a molar ratio from about 0.1:1 to about 1.5:1 moles of polyepoxide to moles of polyamine.

2. The method of claim 1 wherein the polyamine is ethylenediamine; diethylenetriamine; triethylenetetramine; 1,3-propanediamine; bis(2-amino-ethyl)sulfide; 1,6-hexanediamine or polyethylenimine.

3. The method of claim 1 wherein the polyepoxide is an aromatic based polyepoxide.

4. The method of claim 1 wherein the polyamine is diethylenetriamine or triethylene-tetramine and the polyepoxide is diglycidyl ether of bisphenol A or a polyglycidyl ether of polyphenol-formaldehyde.

5. A method of claim 1 wherein the molar ratio of the polyepoxide and polyamine is from about 0.1:1 to about 1.2:1 moles of polyepoxide to moles of polyalkylenepolyamine.

6. The method of claim 1 wherein the molar ratio of the polyepoxide and polyalkylenepolyamine is from about 0.2:1 to 1.2:1 moles of polyepoxide to moles of polyamine.

7. The method of claim 1 wherein the cured reaction product is in spheroidal bead form.

8. The method of claim 7 wherein the polyamine is ethylenediamine; diethylenetriamine; triethylenetetramine; 1,3-propanediamine; bis(2-amino-ethyl)sulfide, 1,6-hexanediamine or polyethylenimine.

9. The method of claim 7 wherein the polyepoxide is an aromatic based polyepoxide.

10. The method of claim 7 wherein the polyamine is diethylenetriamine or triethylenetetramine and the polyepoxide is diglycidyl ether of bisphenol A or a polyglycidyl ether of polyphenol-formaldehyde.

11. The method of claim 7 wherein the molar ratio of the polyepoxide and polyalkylenepolyamine is from about 0.1:1 to about 1.2:1 moles of polyepoxide to moles of polyalkylenepolyamine.

12. The method of claim 7 wherein the molar ratio of the polyepoxide and polyalkylenepolyamine is from about 0.2:1 to 1.2:1 moles of polyepoxide to moles of polyamine.

13. The method of claim 6 wherein the reactant ratio is from about 0.2:1 to about 0.8:1 epoxy equivalents to amino hydrogen equivalents.

14. The method of claim 12 wherein the reactant ratio is from about 0.2:1 to about 0.8:1 epoxy equivalents to amino hydrogen equivalents.

* * * * *

UNITED STATES PATENT AND TRADEMARK OFFICE
CERTIFICATE OF CORRECTION

PATENT NO. : 4,186,086

DATED : January 29, 1980

INVENTOR(S) : Eldon L. Ward

It is certified that error appears in the above-identified patent and that said Letters Patent are hereby corrected as shown below:

Column 11, Table II, footnote (1), line 4, delete "carboxymthylated" and insert --carboxymethylated--.

Column 11, Table II, footnote (1), line 7, delete "hydroxpropyl" and insert --hydroxypropyl--.

Column 11, Table II, footnote (4), line 2, delete "agglomerationand" and insert --agglomeration and--.

Column 12, line 31, delete "A" and insert --The--.

Column 12, line 34, delete "alkylenepolyamine" and insert --amine--.

Column 12, line 36, delete "polyalkylenepolyamine" and insert --polyamine--.

Column 12, line 56, delete "polyalkylenepolyamine" and insert --polyamine--.

Signed and Sealed this

Twenty-seventh Day of May 1980

[SEAL]

Attest:

SIDNEY A. DIAMOND

Attesting Officer    Commissioner of Patents and Trademarks